(12) United States Patent
Tao et al.

(10) Patent No.: US 8,762,086 B2
(45) Date of Patent: Jun. 24, 2014

(54) PHASE IMBALANCE MONITORING APPARATUS, AMPLITUDE IMBALANCE MONITORING APPARATUS, AND APPARATUS USING THE SAME

(75) Inventors: Zhenning Tao, Beijing (CN); Jun Tian, Beijing (CN); Huijian Zhang, Beijing (CN); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 12/232,179

(22) Filed: Sep. 11, 2008

(65) Prior Publication Data

US 2009/0119043 A1    May 7, 2009

(30) Foreign Application Priority Data

Sep. 14, 2007    (CN) .......................... 2007 1 0153305

(51) Int. Cl.
*G01R 13/00*    (2006.01)

(52) U.S. Cl.
USPC .......................................................... 702/66

(58) Field of Classification Search
USPC .......................................................... 702/66
See application file for complete search history.

(56) References Cited

U.S. PATENT DOCUMENTS

| | | | |
|---|---|---|---|
| 4,675,839 A * | 6/1987 | Kerr .............................. | 708/815 |
| 5,134,624 A * | 7/1992 | Ono ................................. | 372/32 |
| 2004/0082300 A1* | 4/2004 | Scheck ........................ | 455/126 |
| 2005/0100110 A1 | 5/2005 | Pietraski | |

FOREIGN PATENT DOCUMENTS

| | | |
|---|---|---|
| CN | 101388729 | 5/2012 |
| JP | 9-261294 | 10/1997 |
| JP | 11-88456 | 3/1999 |
| JP | 2001-111641 | 4/2001 |
| JP | 2004-40678 | 2/2004 |
| JP | 2004-363757 | 12/2004 |
| JP | 2006-81045 | 3/2006 |
| JP | 2006-166005 | 6/2006 |
| JP | 2007-43290 | 2/2007 |

OTHER PUBLICATIONS

Chinese Office Action issued Jan. 26, 2011 in corresponding Chinese Application No. 200710153305.6.
Japanese Office Action mailed Nov. 19, 2013 in corresponding Japanese Application No. 2008-235382.
Japanese Office Action mailed Jun. 4, 2013 in corresponding Japanese Patent Application No. 2008-235382.
Japanese Office Action issued Oct. 2, 2012 in corresponding Japanese Patent Application No. 2008-235382.
Japanese Office Action issued Oct. 15, 2013 for corresponding Japanese Patent Application No. 2012-186618.
Japanese Office Action mailed Aug. 27, 2013 in corresponding Japanese Application No. 2008-235382.
Japanese Office Action mailed Jun. 26, 2012 issued in corresponding Japanese Patent Application No. 2008-235382.

* cited by examiner

*Primary Examiner* — Tung S Lau
(74) *Attorney, Agent, or Firm* — Staas & Halsey LLP (57) ABSTRACT

The present invention discloses a phase imbalance monitoring apparatus, an amplitude imbalance monitoring apparatus, as well as an apparatus incorporating the same. The phase imbalance monitoring apparatus is for use in an apparatus in which imbalance between an I branch signal and a Q branch signal in quadrature to each other is required to be monitored, and is characterized in comprising a preprocessing unit, for performing preprocessing on the I branch signal and the Q branch signal to extract essential information relevant to correlation of the signals; and a correlation unit, for performing correlation processing on the extracted essential information to learn of the phase imbalance between the I branch signal and the Q branch signal.

5 Claims, 12 Drawing Sheets

PHASE IMBALANCE MONITORING APPARATUS, AMPLITUDE IMBALANCE MONITORING APPARATUS, AND APPARATUS USING THE SAME

CROSS-REFERENCE TO RELATED APPLICATIONS

This application claims the benefit of Chinese Application No. 200710153305.6, filed Sep. 14, 2007, in the State Intellectual Property Office of the People's Republic of China, the disclosure of which is incorporated herein by reference.

BACKGROUND OF THE INVENTION

1. Field of the Invention

The present invention relates to apparatuses required to monitor imbalance between two branches of signals in quadrature to each other, and more particularly to a phase imbalance monitoring apparatus and an amplitude imbalance monitoring apparatus in an optical communication system, and a receiver incorporating a phase imbalance monitoring apparatus or an amplitude imbalance monitoring apparatus.

2. Description of the Related Art

With the gradual enhancement on the requirements of capacity and flexibility of the optical communication system, the coherent optical communication technology has become more and more important. In comparison with incoherent technology (such as on-off key, OOK) or self-coherent technology (such as differential quadrature phase-shift keying, DQPSK) already widely applied in the field of optical communications, the coherent technology has the following advantages: optical signal-to-noise ratio (OSNR) gain of 3 dB; the capability to use equalization technologies; and the capability to use more efficient modulation technologies (such as quadrature modulation, QAM).

One important device in the coherent receiver is the hybrid, such as the product provided by Optoplex Corporation. Due to limitations of the devices, the phase between the in-phase branch output I and the quadrature branch output Q of the hybrid is not exactly 90°, and the offset is referred to as IQ phase imbalance. In addition, the powers of the two branches are also slightly different, and the offset is referred to as IQ amplitude imbalance. Such imbalances would degrade the system performance, so that it is necessary for the coherent receiver to detect the imbalances and compensate for them.

Figure 1:
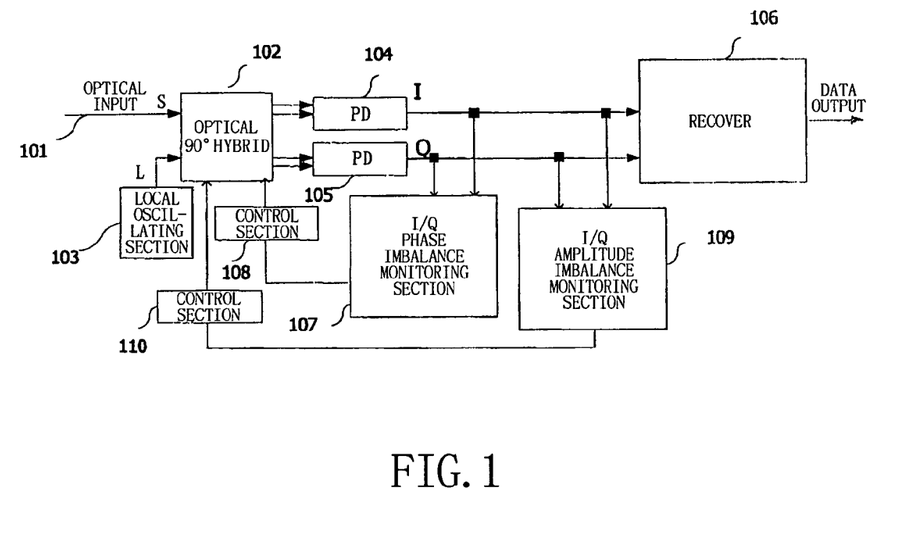
FIG. 1 is a schematic structural view showing the entire structure of a correlation receiver according to the prior art.

FIG. 1 is a schematic structural view that exemplarily illustrates a coherent receiver according to the state of the art. As shown in FIG. 1, the receiver comprises an optical 90° hybird 102, a local oscillating section 103, PD sections 104 and 105, a recover 106, an I/Q phase imbalance monitoring section 107, an I/Q amplitude imbalance monitoring section 109, and control sections 108 and 110.

A received optical signal 101 and an output of the local oscillating section 103 are inputted to the optical 90° hybird 102. The optical 90° hybird 102 generates four optical signals, namely S+L, S−L, S+jL and S−jL, wherein S is the received optical signal, L is the output of the local oscillating section 103, and j indicates 90° phase shift. For instance, the optical 90° hybird 102 can be a product provided by Celight Corporation. The PDs 104 and 105 convert the four optical signals into two electric signals. Specifically, for example, PD 104 converts S+L and S−L into an I branch signal, and PD 105 converts S+jL and S−jL into a Q branch signal. The I branch signal and the Q branch signal should be in quadrature to each other in principle. The recover 106 recovers data in the I branch and Q branch signals by means of a carrier phase recover, a match filter, and a data recover, etc. The recover can be implemented either in the analog domain or in the digital domain. As noted above, due to reasons such as the hardware performance of the optical 90° hybird 102, phase imbalance and amplitude imbalance might occur in the I branch and Q branch signals. As shown in FIG. 1, the I/Q phase imbalance monitoring section 107 monitors the phase imbalance, while the I/Q amplitude imbalance monitoring section 109 monitors the amplitude imbalance. Moreover, the control sections 108 and 110 respectively control the optical 90° hybird 102 in accordance with the monitoring results of the I/Q phase imbalance monitoring section 107 and the I/Q amplitude imbalance monitoring section 109, so as to compensate the detected phase imbalance and amplitude imbalance. Specifically, when the I/Q phase imbalance is positive, the control section outputs a positive voltage to a phase control port of the optical 90° hybird to reduce phase shift of the Q branch (or I branch), and vice versa.

In the detection of phase imbalance and amplitude imbalance, the technology proposed in "*Digital filter equalization of analog gain and phase mismatch in I-Q receivers*" Fred Harris, 5th IEEE International Conference on Universal Personal Communications, 1996, and the technology proposed in U.S. Pat. No. 6,917,031 B1 "method for quadrature phase angle correction in a coherent receiver of a dual-polarization optical transport system" have been in current used. Both of the two calculate correlation between I and Q in the digital domain, wherein when phase imbalance is zero, correlation is also zero, and the correlation is in direct proportion to the phase imbalance. Harris' paper makes use of feedback digital compensation loop, while the U.S. Pat. No. 6,917,031 B1 makes use of feed forward digital compensation. Harris' paper also provides an IQ amplitude imbalance detection and compensation method. All the foregoing methods require complicated digital signal processing, such as multiplication and squaring of complex numbers. The bit rate of certain systems (such as the optical communication system) is as high as 43 Gbit/s. It is very difficult to perform digital signal processing under such high speed signals, so that the methods of the conventional electric communication systems as mentioned above are difficult for application.

In addition, in terms of analog signals, since the capacity of the optical communication system can be as high as 43 Gbit/s, the bandwidths of the I branch and the Q branch can reach as high as 20 GHz or more. Accordingly, if the methods of the aforementioned documents were directly applied to the analog signals, a bandwidth of approximately 20 GHz would be required for the multiplier of the relevant devices, and such an analog multiplier is very difficult for implementation.

SUMMARY OF THE INVENTION

The present invention is proposed to provide a phase imbalance monitoring apparatus, an amplitude imbalance monitoring apparatus and a receiver incorporating the same to solve one or more problems existent in the state of the art.

According to the first aspect of the present invention, there is provided a phase imbalance monitoring apparatus, which is for use in an apparatus in which imbalance between an I branch signal and a Q branch signal in quadrature to each other is required to be monitored, and which is characterized in comprising a preprocessing unit, for performing preprocessing on the I branch signal and the Q branch signal to extract essential information relevant to correlation of the signals; and a coherent unit, for performing correlation processing on the extracted essential information to calculate the phase imbalance between the I branch signal and the Q branch signal.

The phase imbalance monitoring apparatus according to the second aspect of the present invention, which is based on the first aspect, is characterized in that the I branch signal and the Q branch signal are digital signals, that the preprocessing unit comprises a first sign obtaining unit, for obtaining a sign of the I branch signal, and a second sign obtaining unit, for obtaining a sign of the Q branch signal; and that the correlation unit comprises an exclusive-or unit, for performing exclusive-or operation on the obtained signs of the I branch signal and the Q branch signal; and an averager, for averaging a result of the exclusive-or operation of the exclusive-or unit.

The phase imbalance monitoring apparatus according to the third aspect of the present invention, which is based on the second aspect, is characterized in that the I branch signal and the Q branch signal are multiplexed signals, that the phase imbalance monitoring apparatus or the apparatus in which imbalance between an I branch signal and a Q branch signal in quadrature to each other is required to be monitored further comprises a demultiplexing device for demultiplexing the I branch signal and the Q branch signal, and that the first sign obtaining unit and the second sign obtaining unit respectively obtain the signs of the demultiplexed I branch signal and Q branch signal.

The phase imbalance monitoring apparatus according to the fourth aspect of the present invention, which is based on the first aspect, is characterized in that the apparatus in which imbalance between an I branch signal and a Q branch signal in quadrature to each other is required to be monitored is a receiver in an optical communication system.

The phase imbalance monitoring apparatus according to the fifth aspect of the present invention, which is based on the second aspect or the third aspect, is characterized in that the phase imbalance monitoring apparatus or the apparatus in which imbalance between an I branch signal and a Q branch signal in quadrature to each other is required to be monitored further comprises a down-sampling device for performing down-sampling on the I branch signal and the Q branch signal, and that the first sign obtaining unit and the second sign obtaining unit respectively obtain the signs of the down-sampled I branch signal and Q branch signal.

The phase imbalance monitoring apparatus according to the sixth aspect of the present invention, which is based on the second aspect, is characterized in that the demultiplexing device is a 1:N serial-to-parallel converter.

The phase imbalance monitoring apparatus according to the seventh aspect of the present invention, which is based on the first aspect, is characterized in that the preprocessing unit comprises a first signal bandwidth reducing unit for reducing the bandwidth of the I branch signal, and a second signal bandwidth reducing unit for reducing the bandwidth of the Q branch signal, and that the correlation unit is a multiplier and an averager sequentially arranged in series.

The phase imbalance monitoring apparatus according to the eighth aspect of the present invention, which is based on the seventh aspect, is characterized in that the first signal bandwidth reducing unit and the second signal bandwidth reducing unit are formed of identical ones from a low-pass filter, a high-pass filter and a band-pass filter.

According to the ninth aspect of the present invention, there is provided an amplitude imbalance monitoring apparatus, which is for use in an apparatus in which imbalance between an I branch signal and a Q branch signal in quadrature to each other is required to be monitored, and which is characterized in comprising a first absolute value obtaining unit, for obtaining an absolute value of an amplitude of the I branch signal; a second absolute value obtaining unit, for obtaining an absolute value of an amplitude of the Q branch signal; a comparator, for comparing the obtained absolute value of the amplitude of the I branch signal with the obtained absolute value of the amplitude of the Q branch signal; and an averager, for averaging a comparison result of the comparator.

The amplitude imbalance monitoring apparatus according to the tenth aspect of the present invention, which is based on the ninth aspect, is characterized in that the I branch signal and the Q branch signal are multiplexed signals, that the amplitude imbalance monitoring apparatus or the apparatus in which imbalance between an I branch signal and a Q branch signal in quadrature to each other is required to be monitored further comprises a demultiplexing device for demultiplexing the I branch signal and the Q branch signal, and that the first absolute value obtaining unit and the second absolute value obtaining unit respectively obtain the absolute values of the amplitudes of the demultiplexed or down-sampled I branch signal and Q branch signal.

The amplitude imbalance monitoring apparatus according to the eleventh aspect of the present invention, which is based on the ninth aspect or the tenth aspect, is characterized in that the amplitude imbalance monitoring apparatus or the apparatus in which imbalance between an I branch signal and a Q branch signal in quadrature to each other is required to be monitored further comprises a down-sampling device for performing down-sampling on the I branch signal and the Q branch signal, and that the first absolute value obtaining unit and the second absolute value obtaining unit respectively obtain the absolute values of the amplitudes of the down-sampled I branch signal and Q branch signal.

The amplitude imbalance monitoring apparatus according to the twelfth aspect of the present invention, which is based on the tenth aspect, is characterized in that the demultiplexing device or the down-sampling device is a 1:N serial-to-parallel converter, where N is a positive integer greater than 1.

The amplitude imbalance monitoring apparatus according to the thirteenth aspect of the present invention, which is based on the ninth aspect, is characterized in that the apparatus in which imbalance between an I branch signal and a Q branch signal in quadrature to each other is required to be monitored is a receiver in an optical communication system.

According to the fourteenth aspect of the present invention, there is provided an amplitude imbalance monitoring apparatus, which is for use in an apparatus in which imbalance between an I branch signal and a Q branch signal in quadrature to each other is required to be monitored, and which is characterized in comprising a first power measuring unit for measuring the power of the I branch signal, a second power measuring unit for measuring the power of the Q branch signal, and a subtracting unit for subtracting the power of the I branch signal from the Q branch signal.

According to the fifteenth aspect of the present invention, there is provided an apparatus in which imbalance between an I branch signal and a Q branch signal in quadrature to each other is required to be monitored, characterized in comprising the phase imbalance monitoring apparatus according to the aforementioned first to eighth aspects and/or the amplitude imbalance monitoring apparatus according to the aforementioned ninth to fourteenth aspects.

According to the sixteenth aspect of the present invention, there is provided a phase imbalance monitoring method, which is applied to an apparatus in which imbalance between an I branch signal and a Q branch signal in quadrature to each other is required to be monitored, and which is characterized in comprising a first sign obtaining step, for obtaining a sign of the I branch signal, a second sign obtaining step, for obtaining a sign of the Q branch signal, an exclusive-or step, for performing exclusive-or operation on the obtained signs of the I branch signal and the Q branch signal, and an averaging step, for averaging a result of the exclusive-or operation by the exclusive-or step.

According to the seventeenth aspect of the present invention, there is provided a phase imbalance monitoring method, which is applied to an apparatus in which imbalance between an I branch signal and a Q branch signal in quadrature to each other is required to be monitored, and which is characterized in comprising a first signal bandwidth reducing step, for reducing the bandwidth of the I branch signal, a second signal bandwidth reducing step, for reducing the bandwidth of the Q branch signal, and a correlation step, for performing correlation operation on the I branch signal and the Q branch signal whose bandwidths have been reduced.

According to the eighteenth aspect of the present invention, there is provided an amplitude imbalance monitoring method, which is applied to an apparatus in which imbalance between an I branch signal and a Q branch signal in quadrature to each other is required to be monitored, and which is characterized in comprising a first absolute value obtaining step, for obtaining an absolute value of an amplitude of the I branch signal; a second absolute value obtaining step, for obtaining an absolute value of an amplitude of the Q branch signal; a comparing step, for comparing the obtained absolute value of the amplitude of the I branch signal with the obtained absolute value of the amplitude of the Q branch signal, and an averaging step, for averaging a comparison result of the comparing step.

According to the nineteenth aspect of the present invention, there is provided an amplitude imbalance monitoring method, which is applied to an apparatus in which imbalance between an I branch signal and a Q branch signal in quadrature to each other is required to be monitored, and which is characterized in comprising a first power measuring step for measuring the power of the I branch signal, a second power measuring step for measuring the power of the Q branch signal, and a subtracting step for subtracting the power of the I branch signal from the power of Q branch signal.

As should be noted, such wordings as "comprising" or "including" in the present invention indicate existence of component parts and steps, but they do not exclude the existent of other component parts and steps. In other words, these wordings indicate the meaning of "including but not restricted to".

The present invention makes use of low speed analog method and simplified digital method. In the analog method, the bandwidth of the analog devices can be far less than the code rate of the signal, while the digital method merely contains logic calculation devices without any section for digital signal processing. Accordingly, the present invention reduces the requirement on hardware and is optimally applied to optical communication systems with high code rate.

BRIEF DESCRIPTION OF THE DRAWINGS

Detailed explanations to the present invention with reference to the accompanying drawings make it possible to comprehend other objectives, characteristics and advantages of the present invention in a clearer manner, in the drawings.

DETAILED DESCRIPTION OF THE PREFERRED EMBODIMENTS

The present invention is described in greater detail below with reference to the accompanying drawings. In order to render the present invention clear and concise, this paper omits the descriptions of those component parts of the prior art that might bring unclarity to the present invention. In addition, identical or corresponding component parts are indicated by identical reference numerals in this paper, and repetitive explanations are omitted therefor.

Figure 2:
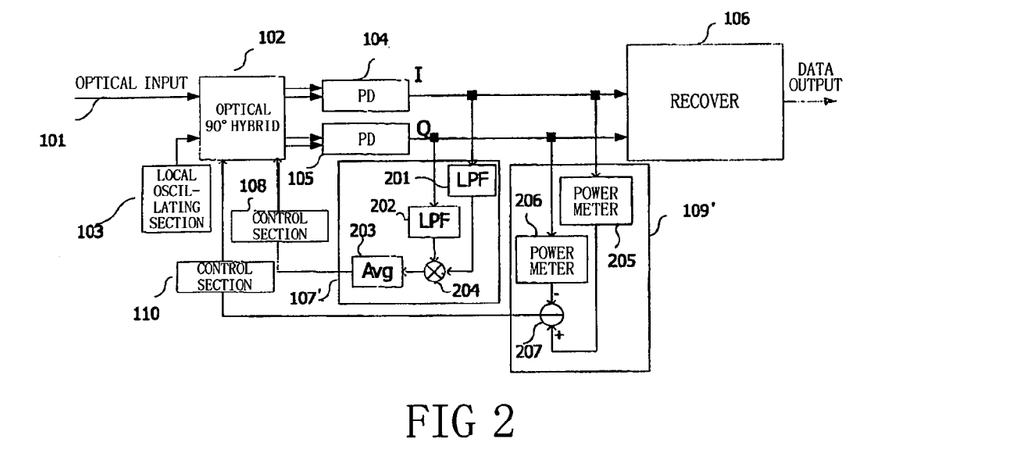
FIG. 2 shows a correlation receiver according to one embodiment of the present invention, and specifically shows its analog phase imbalance monitoring apparatus and analog amplitude imbalance monitoring apparatus.

FIG. 2 shows a correlation receiver according to one embodiment of the present invention, and specifically shows its analog phase imbalance monitoring apparatus and analog amplitude imbalance monitoring apparatus. The receiver of the present invention as shown in FIG. 2 differs from the prior art receiver as shown in FIG. 1 in the different structures of the I/Q phase imbalance monitor and the I/Q amplitude imbalance monitor. Specifically, the prior art I/Q phase imbalance monitor 107 is replaced with an I/Q phase imbalance monitor 107', and the prior art I/Q amplitude imbalance monitor 109 is replaced with an I/Q amplitude imbalance monitor 109'.

As should be noted, the component parts identical with those of the prior art are exemplary rather than exclusive of and restrictive to the present invention. They are shown here only to explain the present invention in a clear manner. The technical solution of the present invention is also applicable to other structures of the prior art receiver. For instance, the PDs 104 and 105 can be replaced with other photoelectric converting means of the prior art, as long as they can generate I branch and Q branch signals. For further example, although the control sections 108 and 110 are shown in the figure as separate component parts, they can nonetheless be integrated as a single component part, etc.

As shown in FIG. 2, the I/Q phase imbalance monitor 107' according to the present invention comprises a low-pass filter (LPF) 201 connected to the I branch, a low-pass filter (LPF) 202 connected to the Q branch, a multiplier 204 for multiplying the output of the low-pass filter 201 with the output of the low-pass filter 202, and an averager 203 for averaging the result of the multiplier 204. The low-pass filters 201 and 202 correspond to the signal bandwidth reducing devices of the present invention for reducing the bandwidth of the signal, so that the bandwidth required for the multiplier 204 can be greatly lower than the bandwidth of the signal. Although the low-pass filters 201 and 202 are employed in this embodiment, it is nonetheless also possible for the present invention to make use of other filters, such as band-pass filter and high-pass filter etc., to reduce the bandwidth of the signal. As should be additionally noted, the multiplier and the averager correspond to the correlation devices of the present invention, but the correlation devices of the present invention can also be embodied as other devices known at the present or in the future. Moreover, the low-pass filter 201, the low-pass filter 202 and the sign function devices 303 and 304 (see FIG. 3) to be discussed in the following paragraphs correspond to the preprocessing unit of the present invention, and the information obtained thereby, such as positive/negative sign information, low frequency information and high frequency information, are essential information relevant to signal correlation.

The principle that the correlation of a filtered signal is still in direct proportion to the IQ phase imbalance of this embodiment of the present invention is explained below.

Suppose the pulse response of the low-pass filter 201/202 be $h(t)$, the correlation of the filtered signal (namely the output of the I/Q phase imbalance monitor 107') will be:

$$\langle I' \otimes h(t) * Q' \otimes h(t) \rangle = \langle I \otimes h(t) * (\cos(\phi)Q + \sin(\phi)I) \otimes h(t) \rangle$$

$$= \sin(\phi)\langle I \otimes h(t) * I \otimes h(t) \rangle + \cos(\phi)\langle I \otimes h(t) * Q \otimes h(t) \rangle$$

$$= \sin(\phi)\langle |I \otimes h(t)|^2 \rangle + \cos(\phi)\left\langle \int I(u) * h(t-u) du * \int Q(v) * h(t-v) dv \right\rangle$$

where I' and Q' indicate signals with imbalanced phases, and they are:

$I' = I$ $Q' = Q\cos(\phi) + I\sin(\phi)$, $\phi$ is phase imbalance,
after exchanging the sequence of integration and average in the second item:

$$= \sin(\phi)\langle I \otimes h(t)|^2 \rangle + \cos(\phi)\iint \langle I(u)*Q(v) \rangle * h(t-u)*h(t-v) du dv$$

Since I and Q are independent and zero meaning in most modulation schemes, $\langle I(u)*Q(v) \rangle$ is zero. Thus, the integration of the second item is zero. Moreover, $\langle |I \otimes h(t)|^2 \rangle$ is the power of the I branch signal after having passed through the low-pass filter, and it is hence almost constant. As a result, the correlation of the filtered signal (namely the output of the I/Q phase imbalance monitor 107') is $\propto \sin(\phi)$, that is to say, it is still in direct proportion to the IQ phase imbalance.

The averager 203 can be realized by a simple low-pass RC filter or a loop filter in the feedback control loop technology, as mentioned in "*Digital Communication,* 3rd edition, John G. Proakis, McGraw-Hill Inc".

The control section 108 converts a monitor signal from the IQ phase imbalance monitor 107' into a control signal, and feeds it to the optical 90° hybird 102. Specifically, when the monitor signal is positive, the control section outputs a positive voltage to the phase control port of the optical 90° hybird to increase phase shift of the Q branch, whereas when the monitor signal is negative, the control section outputs a negative voltage to the phase control port of the optical 90° hybird to reduce phase shift of the Q branch. Thus, the monitor 107', the control section 108 and the optical 90° hybird 102 constitute the feedback control loop. The control section 108 can be a commercial PID control unit known in the art. Additionally, although what is shown in this Figure is compensation by the mode of feedback, it is also possible for a compensating device to perform compensation directly on the I branch or the Q branch, and this is also comprehensible to a person skilled in the art, but this puts higher demand on the hardware. Accordingly, compensation by means of feedback is only exemplary in the present invention. By the same token, compensations to the amplitude in the analog domain and to the phase and amplitude in the digital domain to be discussed later can also be realized either by the mode of feedback or by the mode of direct compensation.

FIG. 2 further shows an I/Q amplitude imbalance monitor 109'. As shown in the Figure, it comprises two power meters 205 and 206 and a subtracter 207. The power meters 205 and 206 respectively measure the powers of the I branch signal and the Q branch signal, while the subtracter 207 generates a difference between the measured powers of the I branch signal and the Q branch signal. It is easy to demonstrate that this difference in powers is also in direct proportion to the amplitude imbalance between the I branch and the Q branch. The power meters 205 and 206 can be simply realized by a commercial Vrms IC (such as the product of Analog Device Corporation). The output voltage of the commercial Vrms IC is in direct proportion to the Vrms value of an inputted signal, namely the square root of the power.

The control section 110 converts a monitor signal from the IQ amplitude imbalance monitor 109' into a control signal, and feeds it to the optical 90° hybird 102. When the monitor signal is positive, the optical 90° hybird 102 increases the gain of the Q branch or decreases the gain of the I branch. By contrast, when the monitor signal is negative, the optical 90° hybird 102 decreases the gain of the Q branch or increases the gain of the I branch. Thus, the monitor 109', the control section 110 and the 90° hybird 102 constitute the feedback control loop. The control section 110 can be a commercial PID control unit known in the art.

Figure 3:
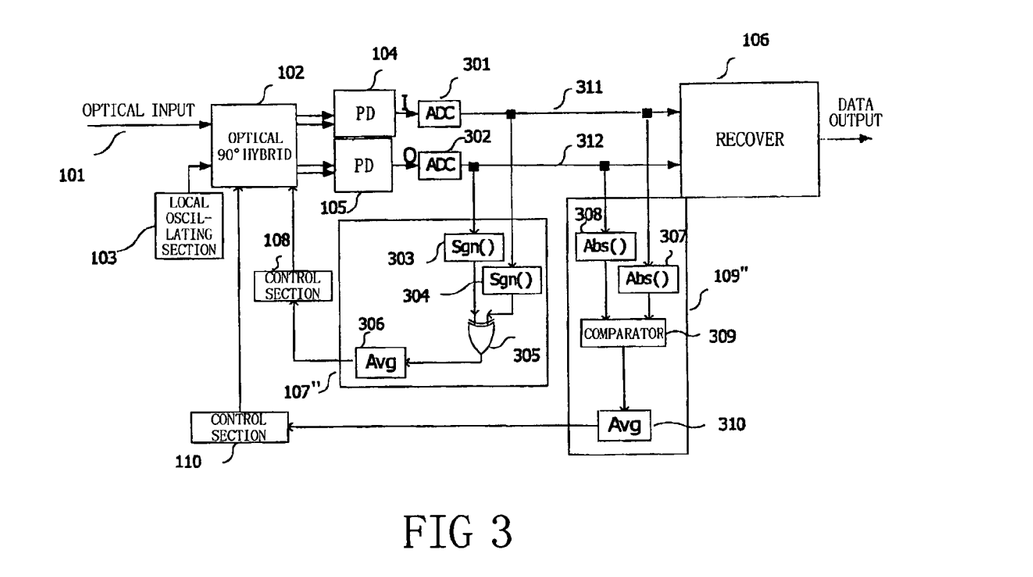
FIG. 3 shows a correlation receiver according to another embodiment of the present invention, and specifically shows its digital phase imbalance monitoring apparatus and digital amplitude imbalance monitoring apparatus.

FIG. 3 shows a correlation receiver according to another embodiment of the present invention, and specifically shows its digital phase imbalance monitoring apparatus and digital amplitude imbalance monitoring apparatus. The receiver of the present invention as shown in FIG. 3 differs from the prior art receiver as shown in FIG. 1 in the different structures of the I/Q phase imbalance monitor and the I/Q amplitude imbalance monitor. Specifically, the prior art I/Q phase imbalance monitor 107 is replaced with an I/Q phase imbalance monitor 107", and the prior art I/Q amplitude imbalance monitor 109 is replaced with an I/Q amplitude imbalance monitor 109".

In FIG. 3, the receiver further comprises analog-to-digital converters (AD converters) 301 and 302. The IQ phase imbalance monitor 107" comprises two sign function devices 303 and 304, an exclusive-or (XOR) gate 305 and an averager 306. The AD converters 301 and 302 sample the I signal and the Q signal of the analog signals, and convert the sampled signals into digital signals. The sign function devices 303 and 304 obtain signs of the inputted signals (digital signals). It is very easy to implement the sign function devices in the digital domain. For instance, it can be implemented by obtaining sign bits. This can be realized by only one logic circuit. When the logic value is 1, the output voltage of the XOR gate 305 is 1, and when the logic value is zero, the output voltage of the XOR gate 305 is −1. The principle that the output of the IQ phase imbalance monitor 107 is still in direct proportion to the IQ phase imbalance is explained below. Although the present invention takes the QPSK modulation as an example, this invention is not restricted to QPSK.

Figure 4:
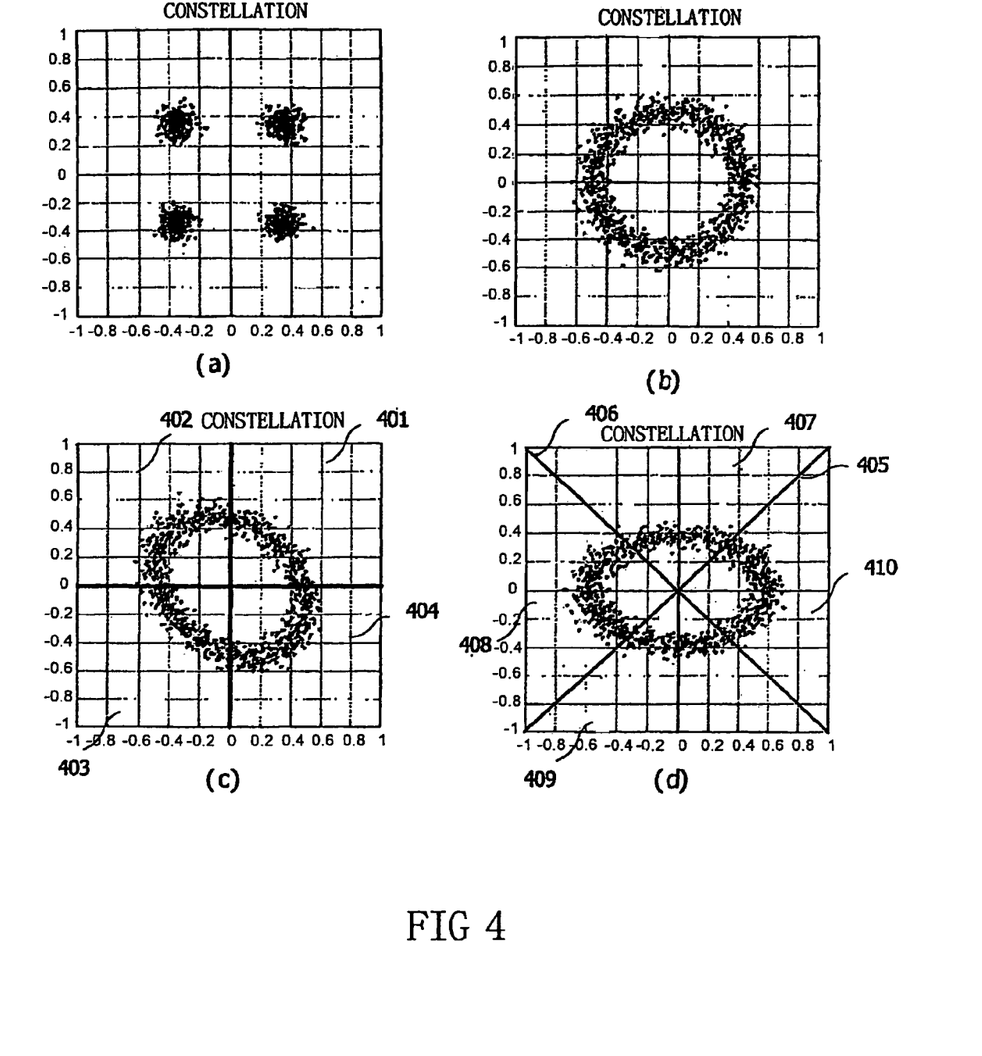
FIG. 4 shows a constellation for illustrating the principle of the present invention.

FIG. 4(*a*) shows a typical QPSK constellation when the carrier wave phase is recovered and there is no IQ imbalance. In the receiver structure of FIG. 3, phase recover is realized in the recover 106 behind the tap points 311 and 312.

As a result, there are some residual phase errors in the IQ tap points 311, 312. The phase errors might be caused by noise of the carrier wave or caused by the frequency offset between the carrier wave and the local oscillator. Accordingly, the constellation as shown in FIG. 4(*a*) rotates and turns to the circumstance as shown in FIG. 4(*b*): it is a circle and symmetric about an axis of I=0 and axis of Q=0. The curves in the first quadrant, the second quadrant, the third quadrant and the fourth quadrant (namely areas 401, 402, 403 and 404 in FIG. 4(*c*)) are equal. When there is a negative IQ phase imbalance, namely φ<0, the circle turns to an ellipse as shown in FIG. 4(*c*), by which time the symmetry is broken. As shown in the Figure, the curves in the first quadrant and the third quadrant (namely areas 401 and 403) become shorter, while the curves in the second quadrant and the fourth quadrant (namely areas 402 and 404) become longer. When the (I, Q) points lie in the first quadrant and the third quadrant (in which case the I branch signal and the Q branch signal have the same sign), the output of the XOR gate 305 as shown in FIG. 3 is −1 (and the logic value is 0), whereas when the (I, Q) points lie in the second quadrant and the fourth quadrant (in which case the I branch signal and the Q branch signal have different signs), the output of the XOR gate 305 is 1 (and the logic value is 1). Accordingly, when the IQ phase imbalance is negative, the output of the averager 306 is positive, and when there is no phase imbalance, the output of the averager 306 is zero because the curves in the first quadrant to the fourth quadrant are equal. Finally, the output of 107" is in direct proportion to the IQ phase imbalance, although the sign is inverted. Therefore, 107" can be used as the IQ phase imbalance monitor.

109" as shown in FIG. 3 indicates a digital IQ amplitude imbalance monitor, which comprises two absolute value function devices 307 and 308, a comparator 309 and an averager 310. The absolute value function devices 307 and 308 are respectively used to calculate the absolute values of the amplitudes of the I branch signal and the Q branch signal. As regards a digital signal, the absolute value function device can be realized by a logic device such as an absolute value calculating device. The comparator is also a logic circuit. When the output of the absolute value function device 307 is greater than the output of the absolute value function device 308, the output of the comparator is 1, and when the output of the absolute value function device 307 is not greater than the output of the absolute value function device 308, the output of the comparator is −1.

As shown in FIG. 4(*d*), when there is a positive amplitude imbalance, that is to say, when the amplitude of the I branch is greater than the amplitude of the Q branch, the constellation turns from a symmetric circle to an ellipse. Lines 405 and 406 when |I|=|Q| split the whole I-Q plane to 4 areas, namely areas 407, 408, 409 and 410. When the point lies in the areas of 408, 410, there is |I|>|Q|. When the point lies in the areas of 407, 409, there is |I|<|Q|. According to the principle of the comparator 309, when the point lies in the areas of 408, 410, the output is 1, and when the point lies in the areas of 407, 409, the output is −1. As a result, in the circumstance where there is positive amplitude imbalance as shown in the Figure, the comparator 309 generates more 1 than −1. Therefore, the output of the averager 310 is positive. If there is no amplitude imbalance, the curves uniformly lie in the areas 407, 408, 409 and 410, so that the output of the averager 310 is zero. Finally, the output of the monitor 109" is in direct proportion to the degree of the IQ amplitude imbalance, so that the monitor 109" can be used as the IQ amplitude imbalance monitor.

The averager 310, the controller 110 and the IQ amplitude imbalance feedback control loop are realized in the same manner as they are realized in FIG. 2.

Figure 5:
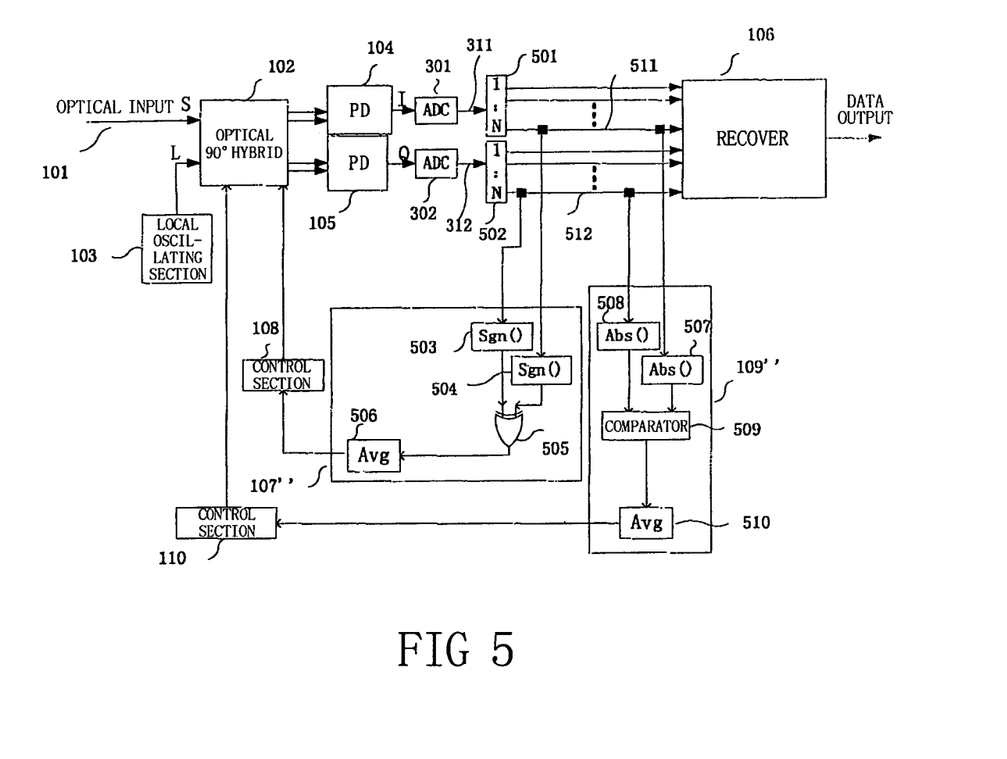
FIG. 5 shows a correlation receiver according to yet another embodiment of the present invention, and specifically shows its another digital phase imbalance monitoring apparatus and another digital amplitude imbalance monitoring apparatus.

FIG. 5 shows a correlation receiver according to yet another embodiment of the present invention, and specifically shows its another digital phase imbalance monitoring apparatus and another digital amplitude imbalance monitoring apparatus. The digital IQ phase/amplitude imbalance monitor/compensator as shown in FIG. 5 put even lower demand on the hardware. In comparison with the IQ phase/amplitude imbalance monitor/compensator as shown in FIG. 3, the one shown in FIG. 5 differs in the fact that two demultiplexing units 501 and 502 (such as 1:N serial-to-parallel converters) are used to demultiplex high-rate data signals, and a ratio between the speed of the demultiplexed signals 511, 512 and the speed of signals 311, 312 is 1/N (where N is a positive integer greater than 1). The inputted signals of the I/Q phase monitor 107" and the amplitude monitor 109" are the demultiplexed 511, 512, so that the speed of the devices 503-510 are N times lower than the speed of 303-310 shown in FIG. 3. This greatly reduces the demand on the speed of the hardware. The remaining parts in FIG. 5 are identical with the corresponding parts in FIG. 3. As should be noted, devices 503-510 in FIG. 5 correspond to devices 303-310 in FIG. 3, and differ from the later only in their lower demand on the hardware, so that detailed explanations thereto are omitted in this paper. Additionally, although the demultiplexing units 501 and 502 are separately disposed with regard to the I/Q phase imbalance monitoring apparatus and the I/Q amplitude imbalance monitoring apparatus, they can nonetheless be included respectively in the I/Q phase imbalance monitoring apparatus and the I/Q amplitude imbalance monitoring apparatus. Moreover, the present invention may also include a down-sampling device (such as a 1/N down-sampling device). The down-sampling device can be directed to the multiplexed I branch signal and Q branch signal, and can also be directed to not-multiplexed I branch signal and Q branch signal. In the circumstance the down-sampling device is directed to the multiplexed I branch signal and Q branch signal, it can be directed to the demultiplexed I branch signal and Q branch signal demultiplexed by the demultiplexing unit, and can also be directed to the not-demultiplexed I branch signal and Q branch signal. In other words, the down-sampling device can be used to replace the aforementioned demultiplexing unit, and can also be used together with the aforementioned demultiplexing unit. When it is used together with the aforementioned demultiplexing unit, no restriction is required for their order of application, that is to say, it is either possible to perform down-sampling after demultiplexing or to perform demultiplexing after down-sampling. Furthermore, the demultiplexing device and the down-sampling device can also be applied to the receiver as shown in FIG. 2.

Figure 6:
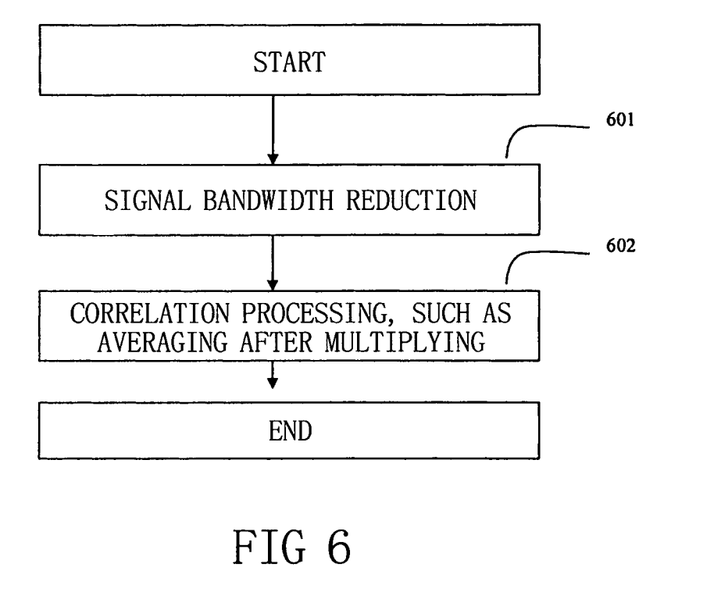
FIGS. 6-11 illustrate flowcharts of the phase imbalance monitoring method and the amplitude imbalance monitoring method according to the present invention.

FIG. 6 is a flowchart showing the analog IQ phase imbalance monitoring method according to an embodiment of the present invention. As shown in FIG. 6, the I branch signal and Q branch signal are firstly reduced of their bandwidths in Step 601 in the analog IQ phase imbalance monitoring method according to the present invention. This can be realized for instance through the low-pass filter, the band-pass filter and the high-pass filter connected to the I branch and the Q branch, and through other bandwidth reducing devices known in the art. In one embodiment this is realized by the low-pass filter. Subsequently in Step 602, the signals having been reduced of their bandwidths are performed with correlation processing, which is carried out by sequentially connected multiplier and averager, or by other correlation devices known in the art.

Figure 7:
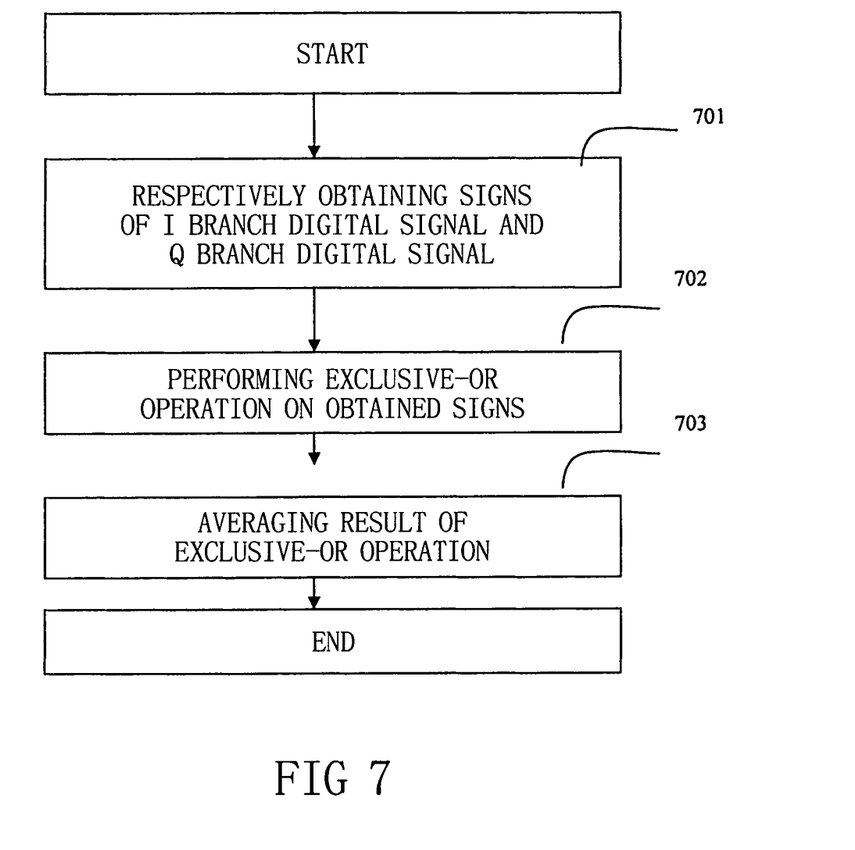

FIG. 7 is a flowchart showing the digital IQ phase imbalance monitoring method according to an embodiment of the present invention. As shown in FIG. 7, signs of the I branch and Q branch digital signals are firstly obtained in Step 701 in the digital IQ phase imbalance monitoring method according to the present invention. This can be realized for instance by a sign function unit connected to the I branch and the Q branch. Subsequently in Step 702, exclusive-or operation is performed on the obtained signs of the I branch signal and Q branch signal through the XOR gate 305 as shown in FIG. 3, for example. The result of the exclusive-or operation is finally averaged in Step 703.

Figure 8:
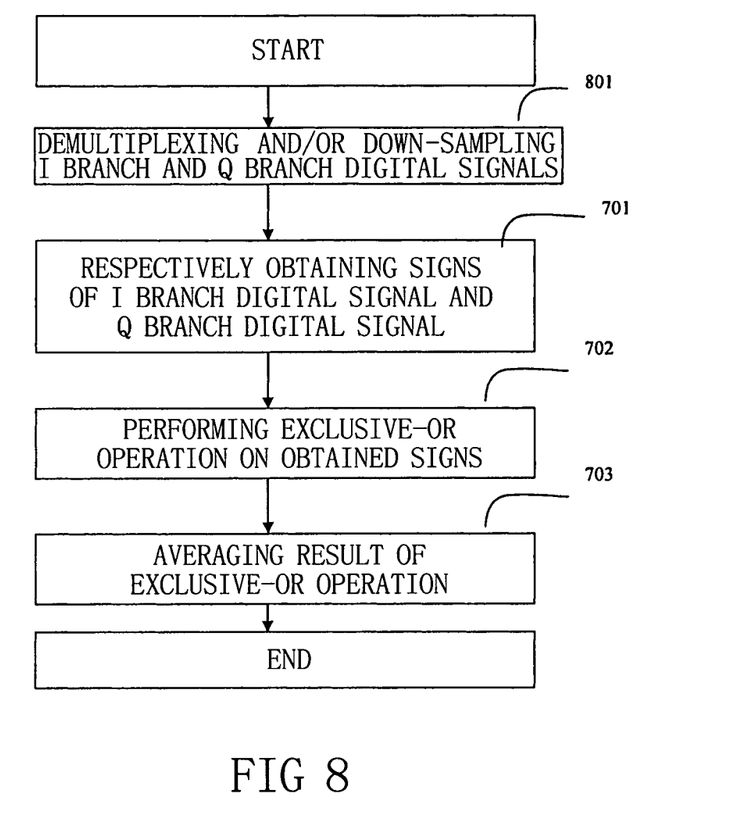

FIG. 8 is a flowchart showing the digital IQ phase imbalance monitoring method according to another embodiment of the present invention. The flowchart of FIG. 8 differs from the flowchart of FIG. 7 in the addition of a demultiplexing and/or down-sampling step 801. The remaining steps in FIG. 8 are the same as the corresponding steps in FIG. 7, and no repetition is hence made thereto.

Figure 9:
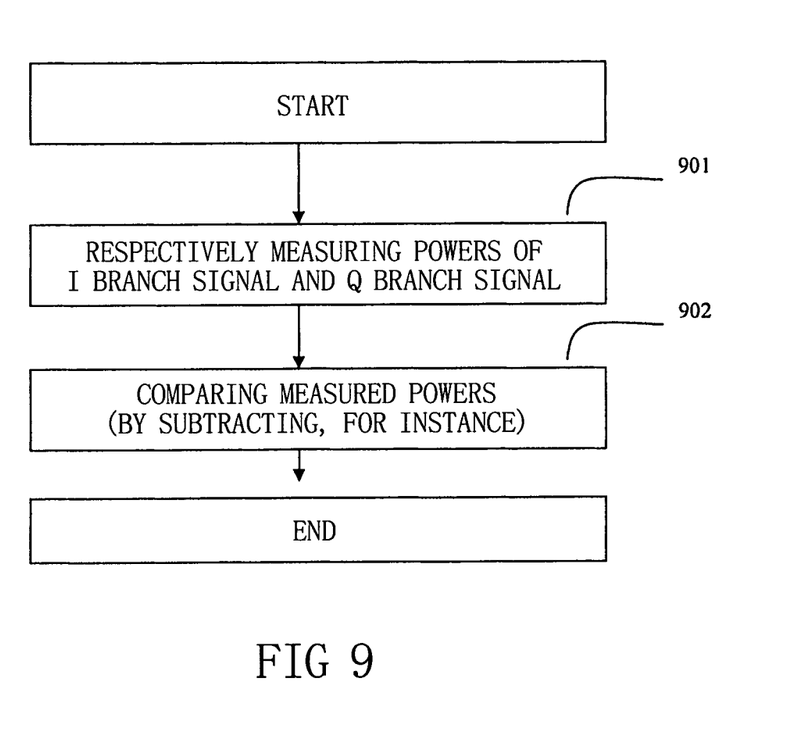

FIG. 9 is a flowchart showing the analog IQ amplitude imbalance monitoring method according to an embodiment of the present invention. As shown in FIG. 9, power measurement is firstly performed on the I branch signal and Q branch signal in Step 901 in the analog IQ amplitude imbalance monitoring method according to the present invention. This can be realized for instance through power meters connected to the I branch and the Q branch. Subsequently in Step 902, the measured powers are subtracted from each other to thereby realize monitor of the amplitude imbalance.

Figure 10:
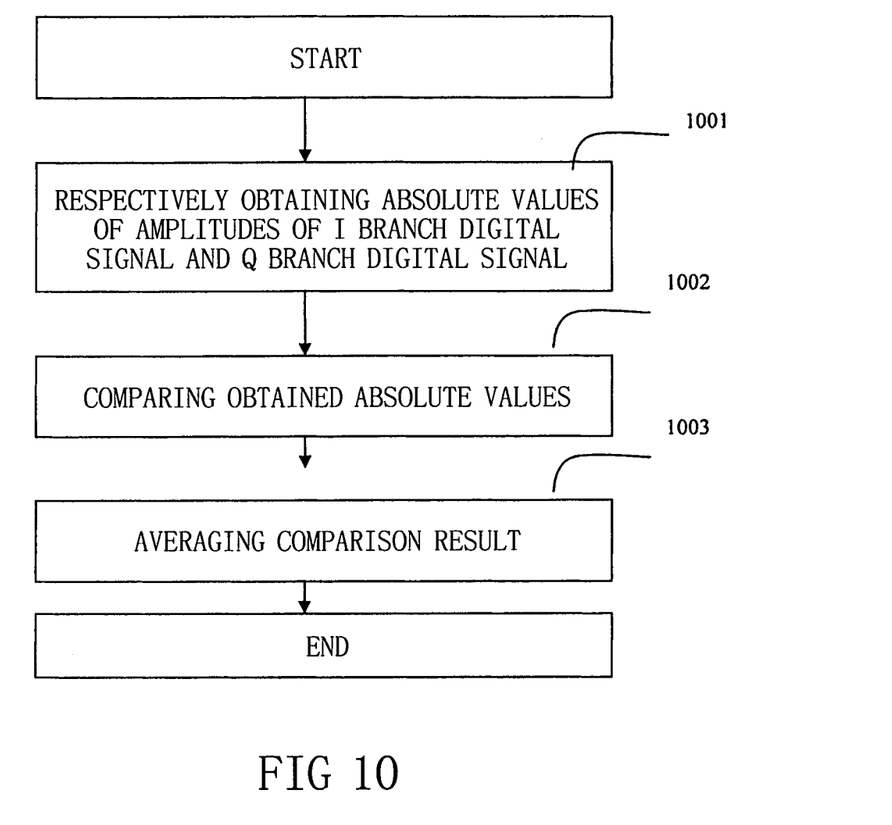

FIG. 10 is a flowchart showing the digital IQ amplitude imbalance monitoring method according to an embodiment of the present invention. As shown in FIG. 10, absolute values of the amplitudes of the I branch and Q branch digital signals are firstly respectively obtained in Step 1001 in the digital IQ amplitude imbalance monitoring method according to the present invention. This can be realized for instance through absolute value units connected to the I branch and the Q branch. Subsequently in Step 1002, the obtained absolute values of the amplitudes of the I branch signal and Q branch signal can be compared by the comparator as shown in FIG. 3, for example. The result of the comparison is finally averaged in Step 1003.

Figure 11:
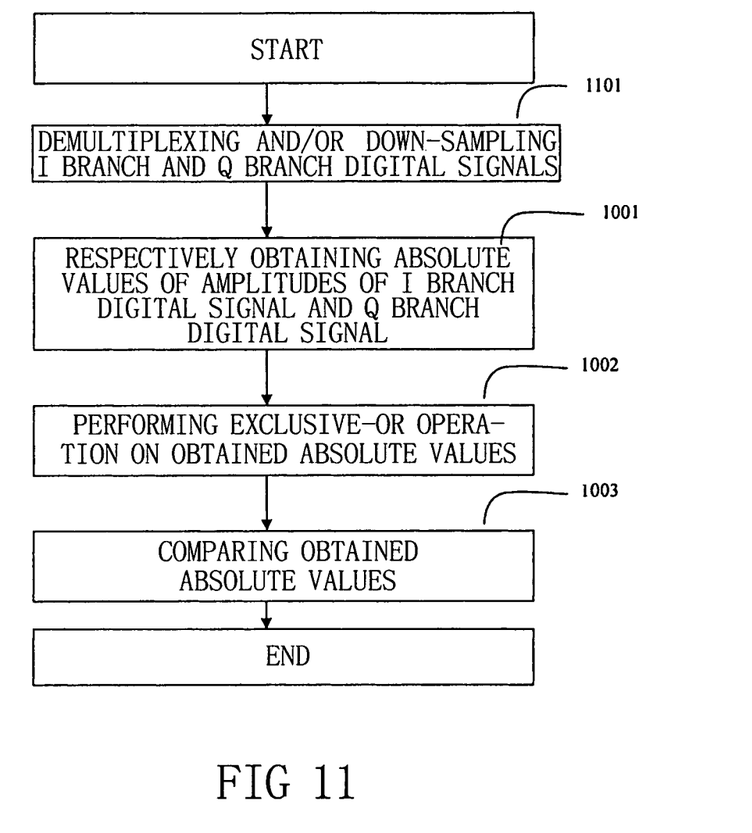

FIG. 11 is another flowchart showing the digital IQ amplitude imbalance monitoring method according to an embodiment of the present invention. The flowchart of FIG. 11 differs from the flowchart of FIG. 10 in the addition of a demultiplexing and/or down-sampling step 1101. The remaining steps in FIG. 11 are the same as the corresponding steps in FIG. 10, and no repetition is hence made thereto.

Figure 12:
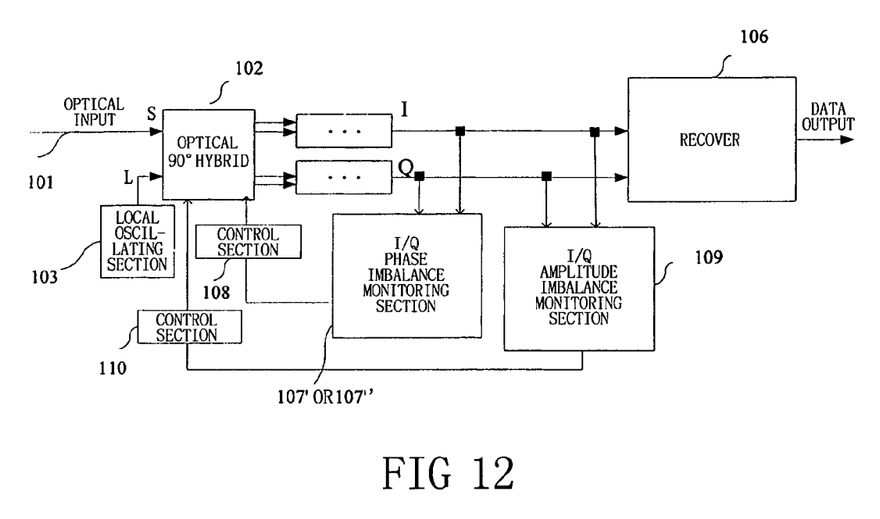
FIGS. 12-15 illustrate other embodiments of the present invention.
Figure 13:
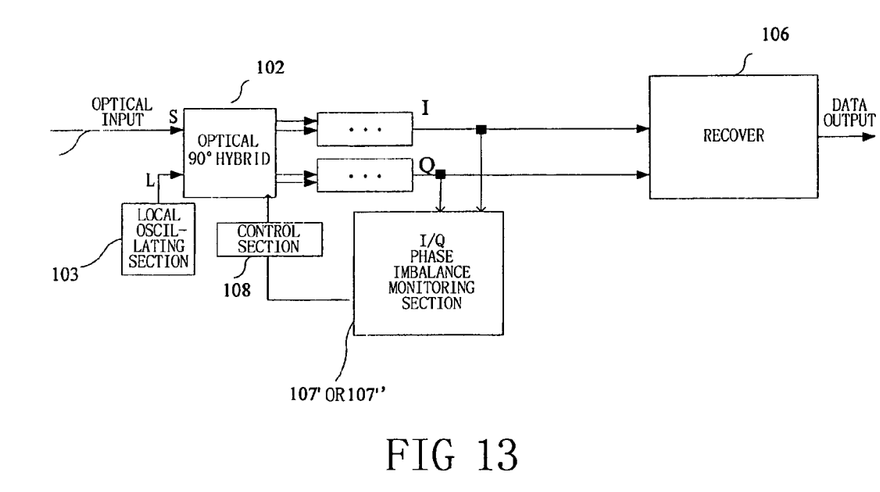
Figure 14:
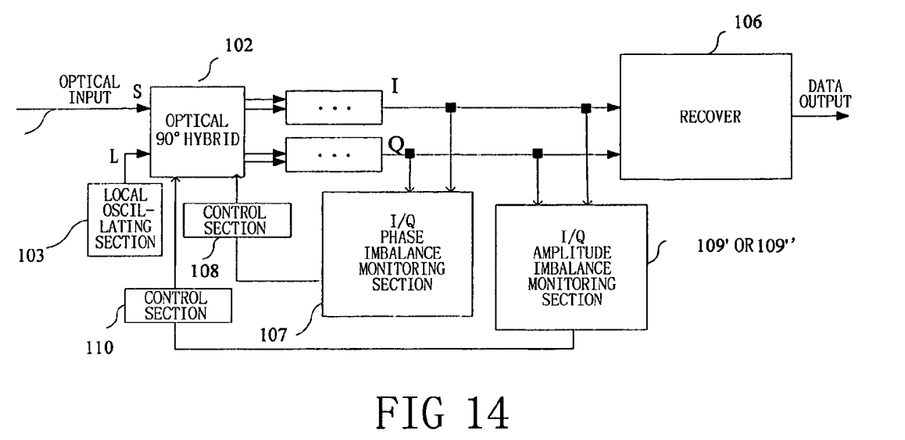
Figure 15:
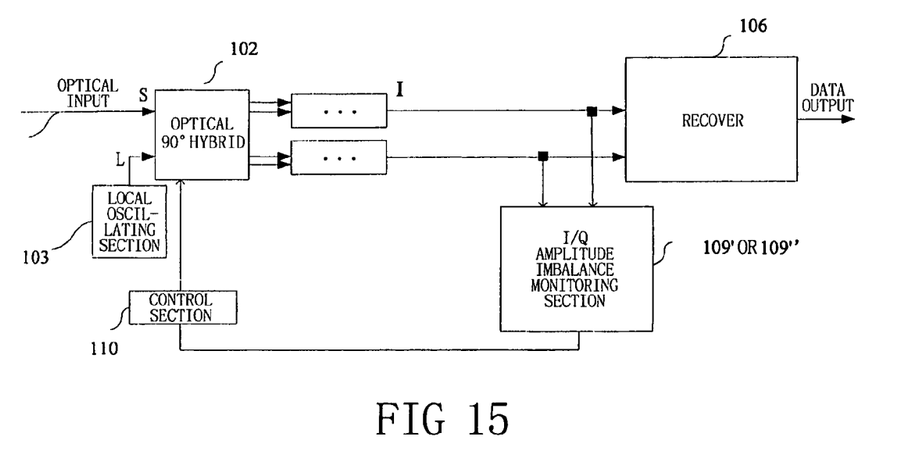

FIGS. 12-15 illustrate other embodiments of the receiver according to the present invention. As shown in FIGS. 12 and 13, according to one embodiment of the present invention, the receiver can only include the I/Q phase imbalance monitoring apparatus 107' or 107" of the present invention without including the I/Q amplitude imbalance monitoring apparatus 109' and 109" of the present invention, and can include the prior art I/Q amplitude imbalance monitoring apparatus 109 or even without including any I/Q amplitude imbalance monitoring apparatus. As shown in FIGS. 14 and 15, according to one embodiment of the present invention, the receiver can only include the I/Q amplitude imbalance monitoring apparatus 109' or 109" of the present invention without including the I/Q phase imbalance monitoring apparatus 107' and 107" of the present invention, and can include the prior art I/Q phase imbalance monitoring apparatus 107 or even without including any I/Q phase imbalance monitoring apparatus.

As should be noted, although in the foregoing description, the present invention is described with regard to the receiver of the optical communication system, it should be nonetheless aware to a person skilled in the art that the present invention is applicable to any apparatus required to monitor imbalances between signals in quadrature to each other, such as those in a wireless communication system, and so on. Accordingly, the I branch and Q branch signals should also be understood as two branches of signals in quadrature to each other in a broad sense.

As should be further noted, the foregoing embodiments of the I/Q phase imbalance monitoring apparatus, the I/Q amplitude imbalance monitoring apparatus and the receiver according to the present invention are only exemplary of, rather than restrictive to, the present invention. In accordance with the teachings of the present invention, a person skilled in the art may make various variations and modifications to the present invention, and these variations and modifications are covered by the protection scope of the present invention as long as they fall within the scope as defined in the claims or analogues thereof.

What is claimed is:

1. A phase imbalance monitoring apparatus, for use in an apparatus in which imbalance between an I branch signal and a Q branch signal in quadrature to each other is required to be monitored, the phase imbalance monitoring apparatus, comprising:
a preprocessor, that performs exclusive-or operation on signs of the I branch signal and the Q branch signal, averages a result of the exclusive-or operation, and learns of the phase imbalance between the I branch signal and the Q branch signal based on the averaged result, and
wherein the I branch signal and the Q branch signal are digital signals.

2. The phase imbalance monitoring apparatus according to claim 1, further comprising:
a demultiplexer that demultiplexes the I branch signal and the Q branch signal, and
wherein the preprocessor performs exclusive-or operation on signs of the demulitplexed I branch signal and Q branch signal and the I branch signal and the Q branch signal are multiplexed signals.

3. The phase imbalance monitoring apparatus according to claim 1, wherein the apparatus in which imbalance between an I branch signal and a Q branch signal in quadrature to each other is required to be monitored is a receiver in an optical communication system.

4. The phase imbalance monitoring apparatus according to claim 1, further comprising a down-sampling device for performing down-sampling on the I branch signal and the Q branch signal, and
wherein the preprocessor obtains the signs of the down-sampled I branch signal and Q branch signal.

5. An apparatus in which imbalance between an I branch signal and a Q branch signal in quadrature to each other is required to be monitored, characterized in comprising a phase imbalance monitoring apparatus, including:
a preprocessor, that performs exclusive-or operation on signs of the I branch signal and the Q branch signal, averages a result of the exclusive-or operation, and learns of the phase imbalance between the I branch signal and the Q branch signal based on the averaged result, and
wherein the I branch signal and the Q branch signal are digital signals.

* * * * *